Oct. 23, 1945.                L. T. WINKLER                2,387,550
         ELECTRICAL METHOD OF AND APPARATUS FOR THE ANALYSIS
            OR IDENTIFICATION OF GASES, VAPORS AND THE LIKE
                         Filed Nov. 23, 1942
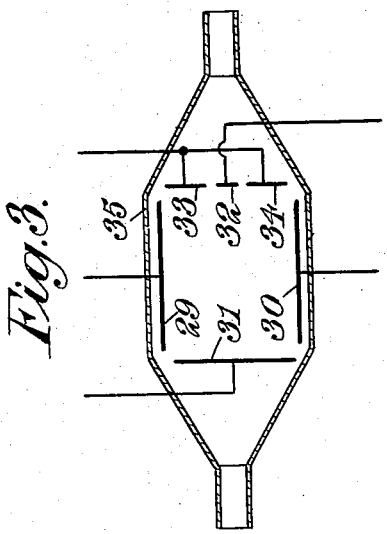
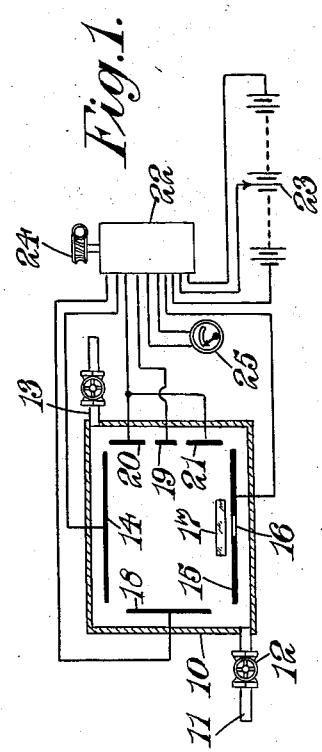
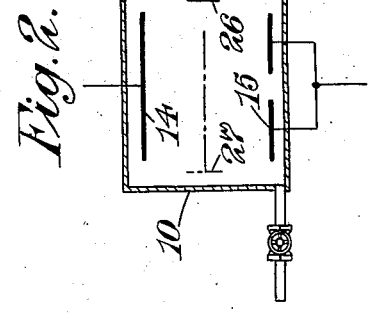
Inventor.
Louis T. Winkler
by Wilkinson & Mawhinney
Attorneys Patented Oct. 23, 1945

2,387,550

UNITED STATES PATENT OFFICE 2,387,550

ELECTRICAL METHOD OF AND APPARATUS FOR THE ANALYSIS OR IDENTIFICATION OF GASES, VAPORS, AND THE LIKE

Louis Theodore Winkler, London, England

Application November 23, 1942, Serial No. 466,699
In Great Britain October 16, 1941

11 Claims. (Cl. 73—18)

This invention relates to an improved method of and apparatus for the analysis or identification of gases, vapors and the like, and has for its principal object to enable rapid and accurate investigations to be made, particularly in the case where any particular gas or gases or vapors are present in extremely small quantities mixed with other gases or vapors. In such cases a chemical analysis, even if possible, is slow and tedious and requires large quantities of the mixture to be available, and the present invention avoids these objections since the method is a highly sensitive one.

This invention accordingly comprises a method for the qualitative or quantitative analysis or identification of mixed gases or vapors, which consists in producing ions in the mixture, grouping the ions of the different constituent gases by virtue of their different ion-mobilities, selectively collecting a group or groups of the ions on different electrodes, and measuring the charge imparted to one or more of these electrodes, said charge being a measure of the quantity of gas present having that particular ion-mobility.

According to another feature of this invention, a method as aforesaid comprises the steps of (a) producing an electric field between electrodes exposed to the mixture of gases to be identified to remove fortuitous ions from the gas, (b) ionizing a gas near one electrode of said field, (c) reversing the direction of the field for a period of time to cause the ions to travel from said electrode through different distances according to their respective ion-mobilities, (d) producing an electric field transverse to the said travel of the ions, (e) collecting the ions from a group or groups on an electrode, and (f) measuring the charge imparted to said electrode.

According to a further feature of this invention, a method as aforesaid comprises the steps of (a) confining the gas to be analyzed in a closed chamber, (b) producing an electric field between electrodes at opposite sides of the chamber to remove fortuitous ions from the gas, (c) ionizing the gas near one electrode of said field, (d) maintaining the field to produce a layer of ions, preferably thin, near said electrode, (e) changing the direction of the field for a period of time to cause the ions to travel from said electrode through different distances according to their respective ion-mobilities, (f) again changing the direction of the field to cause the separated groups or layers of ions to travel to separate electrodes, whereby one group may be received on one electrode, and (g) measuring the charge imparted to said electrode, or electrodes.

According to yet another feature of this invention, the cycle of operations above set forth may be repeated, whereby separate or cumulative measurements of the charge on one or more electrodes can be made.

This invention also includes apparatus for carrying out the above-described method, comprising a chamber having means to introduce into it the gaseous mixture to be analyzed, a pair of electrodes spaced apart, for example at opposite sides of the chamber, for producing an electric field therein, means for ionizing the gas, preferably near one of said electrodes, means for producing an electric field transverse and preferably at right-angles to the direction of the first said field, one of the electrodes in said second field comprising sections insulated from one another, and means for measuring the charge imparted to one or more of said sections.

According to yet another feature of this invention, the apparatus may comprise switchgear operated in any convenient manner automatically to effect the cycle of operations hereinbefore described.

In the accompanying drawing, which is purely diagrammatic,

Figure 1 represents one construction of apparatus for carrying out the method above described, and Figures 2 and 3 illustrate modified constructions of the apparatus.

Referring first to the construction illustrated in Figure 1, there is provided a chamber 10 which is preferably rectangular and is of any convenient size; it is provided with a pipe-connection 11 and valve 12 or other convenient means for introducing into it a quantity of the gas to be analyzed or whereof a constituent or constituents are to be identified. The introduction of a gas may be effected by causing a flow through the chamber, in by the pipe 11 and out by the pipe 13.

This chamber is provided on two of its opposite walls with electrodes 14, 15 for producing an electric field across the chamber and means are provided adjacent the electrode 15 for ionizing a small volume of the gas in the neighbourhood thereof. This ionization may be effected by an aluminium window 16 in the electrode, or a window 17 may be provided in another wall of the chamber 10. The ionization may be effected in any convenient manner as for example by X-rays or by radio-active material, or it may be effected internally in the chamber by heat or by photo-electric action.

The chamber is also provided on two other walls with electrodes for producing an electric field transverse to the field produced by the electrodes 14, 15, and one of these electrodes 18 may take the form of a plate, but the other is constituted by separate plates 19, 20, 21. These plates 19, 20, 21 are insulated from one another and spaced apart in the direction 14, 15, and the number, dimensions and arrangement of these plates is selected according to the analysis which it is desired to effect. When identifying one particular constituent, the electrode 19 is preferably narrow compared with the electrodes 20, 21, and the two latter may be connected together to constitute a single electrode.

A suitable switch mechanism 22 and source of potential 23 are provided for producing the electric fields successively in the manner above described, and it is convenient that the switch mechanism 22 should be arranged for automatic operation, being for example a drum type or commutator type switch which, by its continuous rotation, establishes the necessary circuits in succession. It may be provided with a worm-wheel 24 to be driven by a small electric motor.

A suitable instrument, such as a quadrant electrometer 25 is provided for measuring a charge imparted to the electrode 19 by ions collected on it.

In the operation of this device a sample of the gases or vapors to be analyzed is introduced into the chamber 10, either by a preliminary evacuation of the chamber or, if there is a sufficient quantity of the gas available, by causing a flow through the chamber until it contains the requisite quantity of the gas. In geophysical investigations, the gases can be extracted from the soil from any selected depth in the usual manner and subjected to the analysis. Since the method is an exceedingly sensitive one, it will identify very small traces of particular gases, and, for example, the presence of petroleum underground can be detected by analysis of the sub-soil gases even at a considerable distance from the deposit itself.

When the chamber has been filled with the gas, an electric field is established between the electrodes 14, 15 and maintained for a sufficient length of time completely to de-ionize the gas by collecting any fortuitously present ions on one of the electrodes, preferably the electrode 15. A small quantity of the gas near this electrode is then ionized by the means provided for this purpose, and during this ionization-period the field 14, 15 may be cut off, but preferably it is maintained, possibly at a somewhat lower value, in order to prevent the ions travelling away from the electrode 15 until a thin layer has been produced in the neighbourhood of that electrode.

The field between the electrodes 14, 15 is then reversed to cause the ions to travel towards the plate or electrode 14, and owing to the difference in their ion-mobilities or mass-to-charge-ratios, they group themselves after a suitable time interval in substantially parallel layers spaced across the chamber from the electrode 15 to the electrode 14. At an appropriate time this electric field is then cut off, and a field is applied between the electrode 18 and the electrodes 19, 20, 21 to cause the ions to travel towards the latter. The ions of the layer opposite the electrode 19 are collected on it and a charge thereby imparted to it, and a measurement of this charge on the instrument 25 gives an accurate indication of the number of ions thus collected and therefore of the presence of that particular constituent gas or vapor which is present in the mixture.

It may be desirable in some instances to increase the sensitivity of the method and apparatus by repeating several times the cycle of operations above described, omitting the measurement of the charge on the plate 19. That is to say, the original contents of the chamber are completely de-ionized, and then re-ionized and a further charge collected on the plate 19 until a conveniently measurable charge is obtained.

It will be appreciated that in the operation of this apparatus both the field strengths and the time during which they are maintained are readily controllable and may be adjusted by preliminary calculation when it is desired to identify the presence of any one particular constituent in the mixture; it may be desirable to verify such calculations by preliminary experiment with known proportions of gaseous mixtures.

A screen may be provided in the usual manner near the electrode 19 in order to diminish or eliminate inductive effects between it and the adjacent electrodes. It may also be convenient in some instances to identify two or more constituents simultaneously by collecting their ions on separate electrodes and measuring the charges produced by them.

In the modified construction of apparatus illustrated in Figure 2, the chamber 10 and the electrodes 14, 15 are similar to those described with reference to Figure 1, but instead of applying a transverse field to collect the ions from a layer on the electrode 26, this electrode may be traversed across the chamber to the position 27. If the cycle is to be repeated, this electrode is withdrawn to its original position and the de-ionization and re-ionization and separation are effected as before, and a further charge collected on the electrode 26 as often as may be desired.

The method above described can also be used for any desired gas analysis including, for example, the examination of the atmosphere for the presence of poison gases, or any other possible constituent. In this case the apparatus as shown in Figure 3 may be used comprising a pair of electrodes 29, 30 corresponding to the electrodes 14, 15, and electrodes 31, 32, 33, 34 correspond to the electrodes 18, 19, 20, 21. These may be freely exposed in the atmosphere which is to be tested, or may be enclosed in an open-ended chamber 35 through which a gentle current of the gas is passed. The cycle of operations and measurements are effected in the manner described with reference to Figure 1. When examining the general atmosphere, means may be provided for amplifying the measurement which is made so that remote-reading indicators can be used in conjunction with a suitable disposition of sets of automatically-operated apparatus, so that the distribution of poison gas over an area can be readily mapped out.

This invention is also useful in connection with the investigation of materials which are not easily separated by other chemical or physical means, and is not limited to gases and vapors, since solids and liquids may also be treated by transforming them into gases or vapors and treating them in the manner above described.

Whilst particular constructions of apparatus have been described, it will be understood that the invention is not necessarily limited to them. Thus, for example, it is not essential that the groups of ions when separated should be caused to travel in parallel paths, since by a suitable disposition of control electrodes they may be caused to have divergent paths. Also, in some cases it may not be necessary entirely to separate out constituents, but to collect two or more groups of ions on one measuring electrode, when circumstances permit and this gives adequate information.

A typical operation of the present invention for the detection of positively charged ions such as those derived from a hydrocarbon by electric bombardment is first to make the electrodes 14 and 15 positive and negative respectively. The positively charged ions are thereby collected near the electrode 15; the polarity of these electrodes is then reversed so that the ions travel towards the electrode 14. The pusher electrode 18 is then given a positive potential and the collecting electrodes 19, 20 and 21 are given different negative potentials less than the breakdown potential but high enough to reduce the time of operation. The ions are then collected on the electrodes 19, 20, 21 according to their respective mobilities. The cycle of operations is completed in, say $\frac{1}{20}$ of a second.

The potential imparted to the electrode 19 is measured by an electrostatic volt meter or by an ammeter measuring the average discharge current of the condenser 18 and 19. During this part of the operation the potential applied to the electrodes 14 and 15 is switched off.

The voltages used depend on the spacing of the electrodes, being say 200 volts between the electrodes 14, 15 when they are separated by a distance of 5 centimeters.

I claim:

1. A method of analyzing mixed gases or vapors, which comprises the steps of (a) producing an electric field between electrodes exposed to the mixture of gases to be identified to remove fortuitous ions from the gas, (b) ionizing a gas near one electrode of said field, (c) reversing the direction of the field for a period of time to cause the ions to travel from said electrode through different distances according to their respective ion-mobilities, (d) producing an electric field transverse to the said travel of the ions, (e) collecting the ions from a group or groups on an electrode, and (f) measuring the charge imparted to said electrode.

2. A method of analyzing mixed gases or vapors which comprises the steps of (a) confining the gas to be analyzed in a closed chamber, (b) producing an electric field between electrodes at opposite sides of the chamber to remove fortuitous ions from the gas, (c) ionizing the gas near one electrode of said field, (d) maintaining the field to produce a layer of ions, preferably thin, near said electrode, (e) changing the direction of the field for a period of time to cause the ions to travel from said electrode through different distances according to their respective ion-mobilities, (f) again changing the direction of the field to cause the separated groups or layers of ions to travel to separate electrodes, whereby one group may be received on one electrode, and (g) measuring the charge imparted to said electrode, or electrodes.

3. A method of analyzing mixed gases or vapors which comprises the steps of (a) producing an electric field between electrodes exposed to the mixture of gases to be identified to remove fortuitous ions from the gas, (b) ionizing the gas near one electrode of said field, (c) reversing the direction of the field for a period of time to cause the ions to travel from said electrode through different distances according to their respective ion-mobilities, (d) producing an electric field transverse to the said travel of the ions, (e) collecting the ions from a group or groups on an electrode, and (f) repeating the steps (a) to (e) any desired number of times to increase the charge imparted to said electrode, and (g) measuring the charge imparted to said electrode.

4. Apparatus for analyzing gases or vapors comprising a pair of electrodes spaced apart, means for producing an electric field between them, means for ionizing the gas adjacent one of said electrodes, means for causing the ions to travel towards the other of said electrodes whereby they become grouped into layers according to their respective ion-mobilities, a second pair of electrodes spaced transversely with respect to the first pair of electrodes, means for producing an electric field between said second pair of electrodes, to cause some of the ions to be collected on one of them, and means for measuring the charge imparted to the electrode by the ions collected on it.

5. Apparatus for analyzing gases or vapors, comprising a pair of electrodes, means for producing an electric field between them, a gas between said electrodes, means for ionizing the gas near one of said electrodes, a pair of electrodes spaced transversely with respect to the spacing of the first pair of electrodes, one of said second pair of electrodes being of small dimensions in the direction of the spacing of the first pair of electrodes, means for producing a field between said second pair of electrodes to cause a layer of ions to travel to the said small electrode to impart a charge thereto, and means for measuring said charge.

6. Apparatus for analyzing gases or vapors, comprising a pair of electrodes spaced apart, a gas to be analyzed disposed between said electrodes, means for ionizing said gas in the neighbourhood of one of said electrodes, means for producing an electric field between said electrodes to cause the ions to travel towards the other of said electrodes, an electrode spaced laterally from said first pair of electrodes and of small dimensions in the direction of their spacing, means for traversing said electrode through the space between said first pair of electrodes to collect a layer of ions on it, and means for measuring the charge imparted to said electrode by the ions collected on it.

7. Apparatus for analyzing gases or vapors, comprising a closed chamber, means for introducing into said chamber a quantity of gas to be analyzed, a pair of electrodes spaced apart at opposite sides of said chamber, means for ionizing said gas in said chamber, means for producing an electric field between said electrodes to cause the ions to be collected in a thin layer adjacent to one of them, means for reversing said electric field to cause the ions to travel towards the other electrode at rates determined by their respective ion-mobilities whereby they are separated into layers, an electrode for selectively collecting a layer of said ions, and means for measuring the charge imparted to said electrode by the ions collected on it.

8. Apparatus for analyzing gases or vapors, comprising a closed chamber, means for introducing into said chamber a sample of the gas to be analyzed, a pair of electrodes spaced on opposite sides of said chamber, means for producing an electric field between said electrodes, means for reversing said electric field, means for ionizing the gas between said electrodes, an electrode disposed laterally of the spacing of said first-mentioned pair of electrodes, a plurality of electrodes spaced laterally opposite said last-mentioned electrode, one of said plurality of electrodes being of small dimensions in the direction of the spacing of the first-mentioned pair of electrodes, means for producing an electric field between said lateral electrodes, and means for measuring the charge imparted to said small electrode.

9. Apparatus for analyzing gases or vapors, comprising a pair of electrodes spaced apart, means for producing a gentle flow of gas between said electrodes, means for producing an electric field between said electrodes, means for ionizing the gas near one of said electrodes, a laterally disposed electrode, means for reversing the field for a period of time to cause the ions to travel from said electrode through different distances according to their ion-mobilities, means for impressing on said lateral electrode a potential for collecting on it a layer of said ions, and means for measuring the charge imparted to it by the ions collected on it.

10. Apparatus for analyzing gases or vapors, comprising a pair of electrodes spaced apart, means for introducing to the space between them a gas to be analyzed, a laterally disposed electrode, a source of electric potential, and a mechanically-operated switch which automatically produces an electric field between said first-mentioned pair of electrodes, ionizes the gas near one of said electrodes, reverses said electric field, cuts off said electric field, produces a transverse electric field causing said ions to travel towards said lateral electrode, and measures the charge imparted to said last-mentioned electrode by the ions collected on it.

11. In apparatus for analyzing mixed gases, the combination of a pair of electrodes spaced apart, means for producing an electrical field between said electrodes, means for ionizing the gas between said electrodes, means for collecting said ions adjacent one of said electrodes, a second pair of spaced apart electrodes, means for causing the ions to travel towards the other of said electrodes, said second pair of spaced electrodes arranged transversely to the first mentioned pair of electrodes, means for producing an electric field between the second pair of electrodes, and means for collecting a layer of the ions by the second pair of electrodes after they have been separated in accordance with their respective ion mobilities by the first pair of electrodes.

LOUIS THEODORE WINKLER.